(12) United States Patent
Ishigami et al.

(10) Patent No.: US 12,483,665 B2
(45) Date of Patent: Nov. 25, 2025

(54) IMAGING SYSTEM AND METHOD FOR HIGH RESOLUTION IMAGING OF A SUBJECT

(71) Applicant: Lenovo (Beijing) Limited, Beijing (CN)

(72) Inventors: Koichiro Ishigami, Kanagawa (JP); Koji Kawakita, Kanagawa (JP); Sean Kelly, Morrisville, NC (US); Xiang Feng, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 18/277,877

(22) PCT Filed: Nov. 11, 2022

(86) PCT No.: PCT/CN2022/131244
§ 371 (c)(1),
(2) Date: Aug. 18, 2023

(87) PCT Pub. No.: WO2024/098351
PCT Pub. Date: May 16, 2024

(65) Prior Publication Data
US 2025/0008047 A1 Jan. 2, 2025

(51) Int. Cl.
*H04N 1/60* (2006.01)
*G06T 3/40* (2024.01)
(Continued)

(52) U.S. Cl.
CPC .............. *H04N 1/60* (2013.01); *G06T 3/40* (2013.01); *G06T 5/20* (2013.01); *G06T 5/70* (2024.01);
(Continued)

(58) Field of Classification Search
None
See application file for complete search history.

(56) References Cited

U.S. PATENT DOCUMENTS

| 6,477,270 | B1* | 11/2002 | Wu | G06T 11/001 |
| | | | | 382/167 |
| 2022/0217272 | A1* | 7/2022 | Phillipp | H04N 23/617 |
| 2023/0162369 | A1* | 5/2023 | Sheraj | G06T 7/174 |
| | | | | 382/173 |

FOREIGN PATENT DOCUMENTS

| CN | 107563971 A | 1/2018 |
| CN | 111986084 A | 11/2020 |
| | (Continued) | |

OTHER PUBLICATIONS

CN-114723615-A_machine English translation (Year: 2022).*
(Continued)

*Primary Examiner* — Vu Le
(74) *Attorney, Agent, or Firm* — Osha Bergman Watanabe & Burton

(57) ABSTRACT

An imaging system includes a color imaging sensor that acquires a color image having a color image resolution and color image field of view, a grayscale imaging sensor that acquires a grayscale image having a grayscale image resolution and grayscale image field of view, wherein the grayscale image field of view is at least partially within the color image field of view, and the grayscale image resolution is greater than the color image resolution with respect to the color image field of view, and a first processor that generates an output image by obtaining the color image and the grayscale image, determining a color image region of interest (ROI), bounded by a color image ROI boundary box within the color image, such that the color image ROI (Continued)

includes the subject, and determining a grayscale image ROI, bounded by a grayscale image ROI boundary box within the grayscale image.

20 Claims, 6 Drawing Sheets

(51) Int. Cl.
*G06T 5/20* (2006.01)
*G06T 5/70* (2024.01)
*G06V 10/25* (2022.01)

(52) U.S. Cl.
CPC .... *G06V 10/25* (2022.01); *G06T 2207/10024* (2013.01)

(56) References Cited

FOREIGN PATENT DOCUMENTS

| | | |
|---|---|---|
| CN | 113711584 A | 11/2021 |
| CN | 114723615 A | 7/2022 |

OTHER PUBLICATIONS

CN-107563971-A_machine English translation (Year: 2018).*
CN-111986084-A_machine English translation (Year: 2020).*
International Search Report and Written Opinion issued in corresponding International Application No. PCT/CN2022/131244, mailed Jul. 7, 2023 (8 pages).

* cited by examiner

FIG. 4

IMAGING SYSTEM AND METHOD FOR HIGH RESOLUTION IMAGING OF A SUBJECT

BACKGROUND

The demand for higher resolution imaging systems is continually increasing across a broad range of consumer, business, and industrial applications. As a result, the number of pixels in imaging sensors has increased dramatically in order to achieve higher resolutions. However, continuing to scale the number pixels in imaging sensors may result in diminishing returns because the size of the imaging device and the processing load necessarily also scales with the number of pixels in the imaging sensor. However, many applications do not require a high resolution over the entire field of view. For example, in a case where the main subject of an image or video is a person's face, such as a portrait or a video meeting, the image or video only needs a high resolution in a region of interest (ROI) surrounding the face. Indeed, in these cases, the background areas away from the subject may sometimes even be purposefully blurred for aesthetic or privacy reasons. Therefore, for many different applications, high resolution is not practically necessary over the entire field of view.

SUMMARY

In general, one or more embodiments of the invention relate to an imaging system, method, and non-transitory computer readable medium (CRM) storing computer readable program code for high resolution imaging of a subject. For example, in one aspect, the imaging system comprises: a color imaging sensor that acquires a color image having a color image resolution and a color image field of view; a grayscale imaging sensor that acquires a grayscale image having a grayscale image resolution and a grayscale image field of view, wherein the grayscale image field of view is at least partially within the color image field of view, and the grayscale image resolution is greater than the color image resolution with respect to the color image field of view; and a first processor that generates an output image by: obtaining the color image and the grayscale image; determining a color image region of interest (ROI), bounded by a color image ROI boundary box within the color image, such that the color image ROI includes the subject; determining a grayscale image ROI, bounded by a grayscale image ROI boundary box within the grayscale image, by: generating a transformed color image ROI boundary within the grayscale image by mapping positions, in the color image field of view, along the color image ROI boundary box to corresponding positions within the grayscale image field of view, and generating the grayscale image ROI boundary box corresponding to a box that includes each pixel that is within both the transformed color image ROI boundary and the grayscale image; determining an output image ROI, bounded by an output image ROI boundary box, by: generating an output image pixel space for an output image, wherein the output image pixel space has an output image field of view that is identical to the color image field of view, and the output image pixel space has an output image resolution that is identical to the grayscale image resolution; generating a scaled color image ROI boundary box by scaling the color image ROI boundary box to the output image resolution; generating a transformed grayscale image ROI boundary within the output image pixel space by mapping positions, in the grayscale image field of view and along the grayscale image ROI boundary box, to corresponding positions within the output image field of view; and generating the output image ROI boundary box such that the output image ROI includes only pixels, within the output image pixel space, that are within both the scaled color image ROI boundary box and the transformed grayscale image ROI boundary, and applying a spatial filter to pixels of the output image pixel space that are within the output image ROI, such that color values of the pixels of the output image are based on both color values of the color image and local contrast of the grayscale image.

Other aspects of the invention will be apparent from the following description and the appended claims.

BRIEF DESCRIPTION OF DRAWINGS

FIG. 4 shows an illustration of a group of pixels in an output image, according to one or more embodiments.

DETAILED DESCRIPTION

Figure 1:
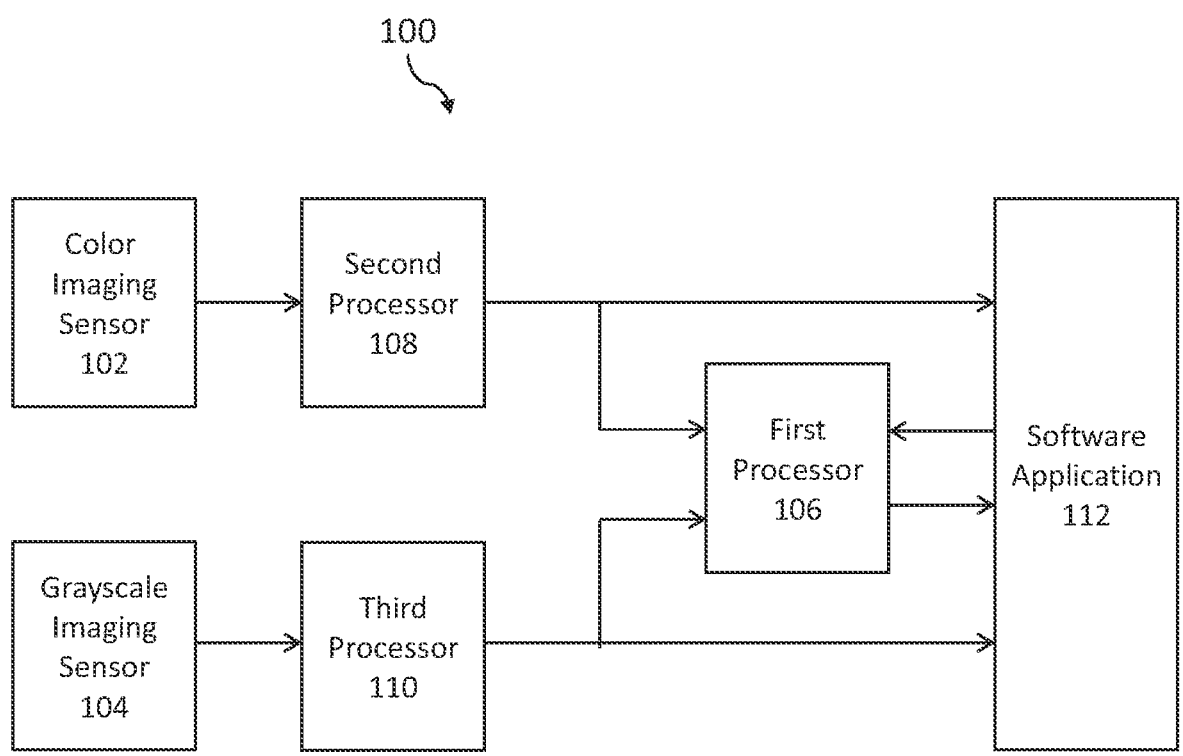
FIG. 1 shows a block diagram of an imaging system, according to one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g. first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the invention provide a system, a method, and a non-transitory computer readable medium (CRM) for high resolution color imaging of a subject. A color imaging sensor acquires a color image. A grayscale imaging sensor acquires a grayscale image that shares at least part of the same field of view as the color image and has a higher resolution than the color image (with respect to the color image field of view). A processor determines a region of interest (ROI) within the color image, where the ROI includes a subject to be imaged in high resolution, such as a human face. This color image ROI is bordered, within the color image, by a boundary box, and the processor maps this color image ROI boundary box onto the grayscale image, taking into account differences in resolution and various distortions between the two imaging sensors. This mapping results in a transformed color image ROI boundary, within the grayscale image, that may be an arbitrary shape due to accounting for the distortion during the mapping/transformation. The processor determines a grayscale image ROI, within the grayscale image, based on the transformed color image ROI boundary, and then maps the boundary box of the grayscale image ROI to an output image pixel space in order to generate a transformed grayscale image ROI boundary. The output image pixel space covers the same field of view as the color image but has the same resolution as the grayscale image (with respect to the color image field of view). The processor then determines an output image ROI, based on the transformed grayscale image ROI boundary.

The processor then generates the output image by upscaling the pixels of the color image to a higher resolution for regions that are outside of the output image ROI and performs a spatial filter to produce a high resolution image of the subject within the output image ROI. The spatial filter interpolates the pixels of the color image using pixel position from the color image and local contrast from the higher resolution grayscale image. In this way, an output image can be generated having a lower-resolution in regions that do not contain the subject of interest, while regions that contain the subject can be processed using the information from both the color imaging sensor and the grayscale imaging sensor to produce a high-resolution color image within this region of interest. Because only a portion of the total output image 140 is higher resolution, cost may be saved in the manufacturing of the system 100 since lower resolution sensors may be used. Additionally, a lower processing load may be achieved as compared with the processing load required to acquire and process a full-chip high-resolution color image.

Figure 2:
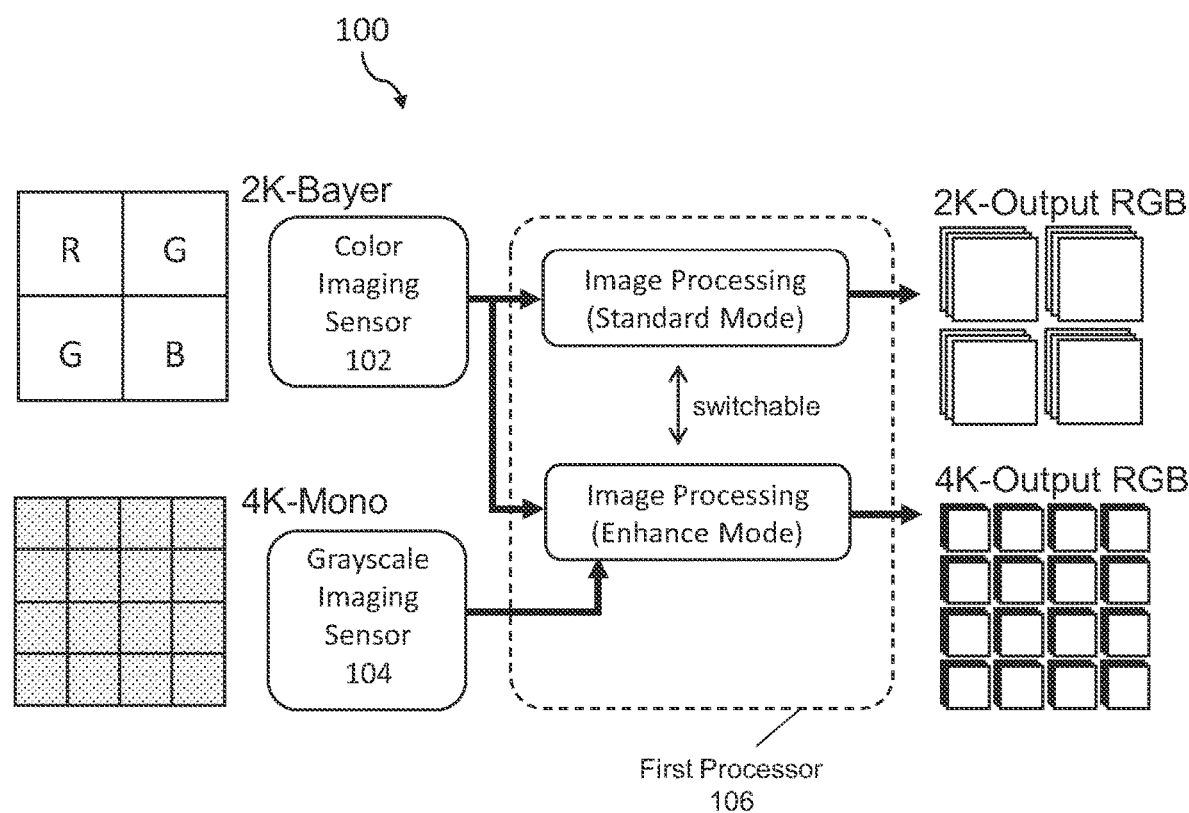
FIG. 2 shows a schematic diagram of an implementation of an imaging system, according to one or more embodiments of the invention.

FIG. 1 shows a block diagram of an imaging system 100 for high-resolution imaging of a subject, according to one or more embodiments. In one or more embodiments, the imaging system 100 includes a color imaging sensor 102 and a grayscale imaging sensor 104. The color imaging sensor 102 may be any imaging sensor that has any suitable number of pixels and can discriminate colors via any suitable color imaging technique. For example, in one or more embodiments, the color imaging sensor may include a Bayer color filter array (CFA) that has a pattern of one red, one blue, and two green pixels as shown in FIG. 2. However, in other embodiments, the color imaging sensor 102 may also include any other CFA such as, but not limited to, RYYB filter, RCBW filter, CYYM filter, Quad Bayer filter, etc. The color imaging sensor 102 may be included in any imaging device such as a camera, web camera, smartphone, desktop computer, laptop computer, or any other device or product that has an imaging capability. Additionally, the color imaging sensor 102 and/or any device including the color imaging sensor 102 may include optical elements (such as lenses, irises, filters, light sources, etc.) and electronics (such as wiring, contacts, electrical components, microcontrollers, FPGAs, processors, etc.) for assisting in generating a color image. The color imaging sensor's (102) resolution and field of view are referred to, within this disclosure, as the color image resolution and the color image field of view, respectively.

In one or more embodiments, the grayscale imaging sensor 104 may be any imaging sensor that is capable of capturing grayscale images. In one or more embodiments, the grayscale imaging sensor 104 may not include a CFA and may only be capable of capturing grayscale images. However, in other embodiments, the grayscale imaging sensor 104 may also be an imaging sensor that is capable of discriminating color. The grayscale imaging sensor 104 may also be included in any imaging device such as a camera, web camera, smartphone, desktop computer, laptop computer, or any other device or product that has an imaging capability. In some embodiments, the grayscale imaging sensor 104 may be incorporated into the same device as the color imaging sensor 102, while in other embodiments, the color imaging sensor 102 and the grayscale imaging sensor 104 may be included in separate devices. Additionally, the grayscale imaging sensor 104 and/or any device including the grayscale imaging sensor 102 may include optical elements (such as lenses, irises, filters, light sources, etc.) and electronics (such as wiring, contacts, electrical components, microcontrollers, FPGAs, processors, etc.) for assisting in generating a grayscale image. The grayscale imaging sensor's (104) resolution and field of view are referred to, within this disclosure, as the grayscale image resolution and the grayscale image field of view, respectively.

In one or more embodiments, a color image, generated by the color imaging sensor 102, and a grayscale image, generated by the grayscale imaging sensor 104, each have a field of view (the color image field of view and the grayscale image field of view). In one or more embodiments the grayscale image field of view of at least partially overlaps with the color image field of view. In some embodiments, the grayscale image field of view may be fully within the color imaging field of view while in other embodiments, the grayscale image field of view may only be partially within the color image field of view, as long as both sensors are able to capture at least a partial image of the same subject. Additionally, in one or more embodiments, the grayscale image field of view may be smaller than the color image field of view. However, this disclosure is not limited to this case, and the grayscale image field of view and the color image field of view may each be any size with respect to each other.

In one or more embodiments, images captured by the grayscale imaging sensor 104 have a higher resolution than images captured by the color imaging sensor 102, in a frame of reference of the color image field of view. In other words, there is no inherent requirement that the grayscale imaging sensor 104 has a higher pixel density as compared with the color imaging sensor 102. Rather, the grayscale imaging sensor 104 may simply be capable of generating grayscale images, over a region of the color image field of view, where the grayscale image has a higher resolution in that region than the color image. In some embodiments, the higher resolution of the grayscale image may be achieved due to a higher pixel density of the grayscale imaging sensor 104. However, in other embodiments, the grayscale imaging sensor 104 may have a similar or lower pixel density than the color imaging sensor 102. In this case for example, optical elements such as lenses may be utilized such that the grayscale imaging sensor 104 has a smaller field of view that is distributed over the full chip of the grayscale imaging sensor 104, but within a smaller region of the color image field of view. Therefore, in the pixel space of the color imaging sensor 102, images produced by the grayscale image sensor 104 have a higher resolution, despite the lower pixel density.

In one or more embodiments, the grayscale imaging sensor 104 may include a filter that blocks an infrared portion of the spectrum. Alternatively, in other embodiments, any infrared filters may be removed resulting in a higher signal-to-noise ratio in the grayscale image.

As shown in FIG. 1, both the color imaging sensor 102 and the grayscale imaging sensor 104 are coupled to one or more processors for processing the image data that is generated by each sensor 102, 104. A first processor 106 performs the main processing that is discussed below in this disclosure. The first processor 106 may be any information processing system or circuitry including but not limited to a central processing unit (CPU), single-board computer, microcontroller, field programmable gate array (FPGA), image processing unit (IPU), image signal processor (ISP) or any other suitable information processing system. However, in addition to the first processor 106, in some embodiments, the color imaging sensor 102 may also be coupled to a second processor 108, and the grayscale imaging sensor 104 may also be coupled to a third processor 110. The second and third processors 108, 110 may each be any information processing system or circuitry including but not limited to a central processing unit (CPU), single-board computer, microcontroller, field programmable gate array (FPGA), image processing unit (IPU), image signal processor (ISP) or any other suitable information processing system.

In one or more embodiments the second processor 108 and the third processor 110 may each process the signals and/or image information output by the color imaging sensor 102 and the grayscale imaging sensor 104 in order to produce a color image and a grayscale image. This processing may include any signal conditioning and/or processing necessary to achieve a high quality or aesthetic color image or grayscale image. However, in other embodiments, either the second processor 108 or the third processor 110 (or both) may be omitted from the imaging system 100 such that the first processor 106 performs all the functionality of the system 100 relating to generating and processing the color image and/or the grayscale image.

In one or more embodiments, each of the processors 106, 108, 110 discussed above may execute or communicate with a software application 112 that displays the color image, grayscale image, and/or processed versions of the color image and grayscale image on a display screen. The software may be any software that displays images for any purpose, including but not limited to teleconferencing applications, video meeting software, image/photo editors, video editors, video or image recording/capture software, or any other software that displays images, videos, or live streams of images/videos. In some embodiments, additional software may be needed to establish proper communication with the processors or the color imaging sensor 102 and/or the grayscale imaging sensor 104. This additional software may be a driver, a basic input output system (BIOS), or any other suitable form of software that enables communication with the sensors 102, 104 or performs processing of the images.

FIG. 2 shows a schematic diagram of an implementation of the imaging system 100 described above, according to one or more embodiments. Beside the color imaging sensor 102 is shown a Bayer pattern color filter array (CFA) that has one red pixel, two green pixels, and one blue pixels. This pattern of color filters is repeated across the color imaging sensor 102 in order to allow the generation of color images. Additionally, in this implementation the color imaging sensor 102 has a 2k resolution (i.e., 1920×1080, or 1920 pixels along one dimension and 1080 pixels along the other dimension of the two-dimensional array). Beside the grayscale imaging sensor 104 is shown the pixel layout of pixels in the grayscale imaging sensor 104. In this implementation, the pixel density of the grayscale imaging sensor 104 is doubled in both dimensions of the two-dimensional array, as compared to the color imaging sensor 102. Therefore, in this implementation, the grayscale images generated will have four times the number of pixels over the same field of view as compared with the color images that are generated. The grayscale image and the color image are output from the sensors 102, 104 to the first processor 106 that implements both an enhance mode and a standard mode. When in the standard mode, the first processor 106 outputs the color image originating only from the color imaging sensor 102, and therefore the final output is a 2k resolution color image. When in the enhance mode, the first processor 106 processes the 2k color image and the 4k grayscale image in order to produce an color output image that has a 4k resolution over a region of interest (this processing will be described in detail below).

According to one or more embodiments, as shown in FIG. 2, the first processor is configured to switch between displaying the color image and the output image (i.e., the output image that is generated by the first processor 106 using the color image and the grayscale image). In other words, the first processor may allow switching between the standard mode and the enhance mode. In some embodiments, a user may control switching between the standard mode and the enhance mode by either software controls within the software application 112 or by a physical switch located on the system 100 that is electronically connected to the first processor. In other embodiments, or in addition to the above, the first processor may also autonomously control switching between the standard mode and the enhance mode based on various conditional inputs that may be predetermined by a user and implemented as software instructions.

Figure 3:
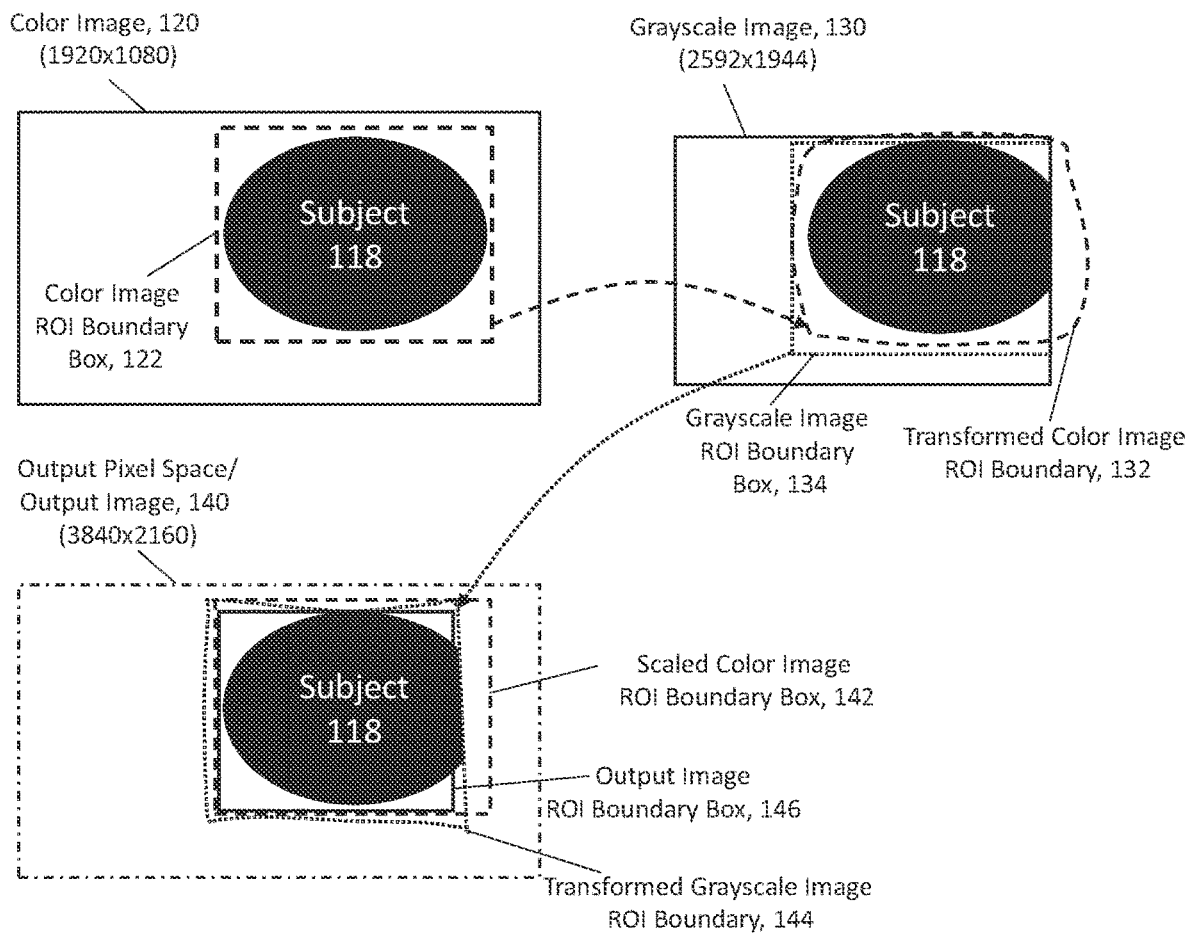
FIG. 3 shows an illustration of the determination of regions of interest boundary boxes in the vicinity of a subject on images of different resolution, according to one or more embodiments of the invention.

Turning now to FIG. 3, the processing, implemented by the first processor 106, of the color image and the grayscale image will now be described. FIG. 3 shows an illustration of the determination of regions of interest boundary boxes in the vicinity of a subject on images of different resolution, according to one or more embodiments.

FIG. 3 shows boxes that represent a color image 120 (acquired by the color imaging sensor 102), a grayscale image 130 (acquired by the grayscale imaging sensor 104), and an output image pixel space 140 (in which an output image is constructed/generated by the first processor 106). As mentioned previously, the color image 120 has a color image resolution, which in this example, for illustration purposes only, is chosen to be 1920×1080 (but could be any arbitrary resolution). The color image 120 also has a color image field of view which is represented by the box frame of the color image 120. Within this color image field of view is an image of the subject 118, which represents an important feature within the field of view, for which a higher resolution image is sought.

The grayscale image 130 also has an inherent resolution, which in this example, for illustration purposes only, is chosen to be 2592×1944 (but could be any arbitrary resolution). The inherent resolution of the grayscale image 130 represents the number of pixels of the grayscale image sensor 104, over which an image of the field of view of the grayscale image sensor 104 is distributed. However, in this illustrative example, the grayscale image 130 also has a grayscale image field of view that is smaller than the color image field of view (i.e., covers only a subregion of the color image 120). Therefore, although the grayscale image has an inherent resolution (or pixel density) of 2592×1944, for the purposes of this disclosure, the grayscale image resolution is defined with respect to the color image field of view. Because the grayscale image field of view covers a smaller subregion of the color image field of view, the grayscale image resolution is greater than the inherent resolution of the grayscale image sensor 104 (i.e., in this case the grayscale image resolution may be equivalent to 3840×2160, in the pixel space of the color image).

According to one or more embodiments, the first processor 106 determines a color image region of interest (ROI) within the color image that is bounded by a color image ROI boundary box 122. In the example shown in FIG. 3, the color image ROI boundary box 122 is shown as a box surrounding the subject 118. In some embodiments the color image ROI (and therefore any other ROI discussed below) may be a rectangle shape. However, the word "box" is only used for convenience in facilitating explanation of this disclosure and does not limit this disclosure. In other embodiments, the ROIs may be any arbitrary shape including but not limited to a circle, oval, square, triangle, polygon, or any arbitrary shape. The color image ROI may be disposed anywhere within the color image (i.e., anywhere within the color image field of view).

In one or more embodiments, the first processor 106 may determine the color image ROI (and therefore the color image ROI boundary box) using any arbitrary method or procedure that is suitable to determining a region of interest within an image or video. For example, in some embodiments, the first processor 106 may use machine vision, face recognition, or other machine learning techniques (e.g., a neural network) to determine the ROI that includes the subject 118. However, in other embodiments, the color image ROI may be predetermined to be a particular subregion of the color image. In still other embodiments, the color image ROI may be determined manually by a user.

In one or more embodiments, once the color image ROI (and therefore the color image ROI boundary box 122) is determined, a grayscale image ROI that is bounded by a grayscale image ROI boundary box 134 within the grayscale image 130. This may be accomplished by generating a transformed color image ROI boundary 132, within the grayscale image 130, by mapping positions in the color image field of view to corresponding positions within the grayscale image field of view. In other words, the color image ROI boundary box 122 is transformed into the pixel space of the grayscale image 130 to generate the transformed color image ROI boundary 132. In some cases, this mapping/transformation may result in part of the transformed color image ROI boundary being outside of the grayscale image field of view, as shown in FIG. 3. This can occur, for example, when the subject 118 is partially outside of the grayscale image field of view.

In one or more embodiments, there may be image distortions in one or both of the color image 120 or the grayscale image 130 such that shapes within the two images may appear to be different with respect to each other. In this case, mapping the color image ROI boundary box 122 to the grayscale image 130 results in a non-box shaped transformed color image ROI boundary 132, in the grayscale image 130 field of view. In some embodiments, in such a case, a predetermined calibration that accounts for image distortions of the grayscale image 130 with respect to the color image 120 is applied in order to generate the transformed color image ROI boundary 132. This effect is illustrated in FIG. 3 where the dashed boundary (transformed color image ROI boundary 132) has irregular, curved edges. In one or more embodiments, this predetermined calibration may include adjustments accounting for various possible distortions such as, but not limited to, pincushion distortions, barrel distortions, waveform distortions or any other distortions or irregularities in the mapping between the color image 120 and the grayscale image 130.

In one or more embodiments, the first processor 106 generates the grayscale image ROI boundary box 134, within the grayscale image 130 corresponding to a box that includes each pixel that is within both the transformed color image ROI boundary and the grayscale image. In other words, the first processor 106 generates a box (which may be any arbitrary shape) that includes all the pixels within the transformed color image ROI boundary 132 that are not outside of the grayscale image field of view. In some cases, as shown in FIG. 3, the grayscale image ROI boundary box 134 may also include some pixels of the grayscale image 130 that are outside of the transformed color image ROI boundary 132 to account for curved sections of the transformed color image ROI boundary 132 that bulge outward due to the distortions discussed above. The grayscale image ROI boundary box 134 bounds the grayscale image ROI, and therefore the process described above results in the determination of the grayscale image ROT. Based on the above, and depending on the position of the color image ROI, the grayscale image ROI may be disposed anywhere within the grayscale image (i.e., anywhere within the grayscale image field of view).

In one or more embodiments, the first processor 106 uses the boundary boxes described above to determine an output image ROI, bounded by an output image ROI boundary box. In order to accomplish this, the first processor 106 generates an output image pixel space for an output image. In other words, the processor 106 generates an array of pixels which will be filled in to construct the output image 140. The output image pixel space has an output image field of view that is identical to the color image field of view and has an output image resolution that is identical to the grayscale image resolution. In other words, the output image 140 will effectively display the same image as the color image 120, but the output image pixel space has a higher pixel density than the color image 120. As will be described below, part of the final output image 140 (the region of interest containing the subject) will have a higher resolution than the color image 120, while the surrounding areas of the output image 140 will effectively have the same resolution as the color image 120 (due to upscaling of the color image).

In one or more embodiments, the first processor 106 generates a scaled color image ROI boundary box 142 by scaling the color image ROI boundary box up to match the output image resolution. This process may be a simple linear scaling since there should be no, or minimal, distortions of the output image 140 with respect to the color image 120.

In one or more embodiments, the first processor 106 generates a transformed grayscale image ROI boundary 144, within the output image pixel space, by mapping positions, in the grayscale image field of view and along the grayscale image ROI boundary box 134, to corresponding positions within the output image field of view. In other words, the grayscale image ROI boundary box 134 is transformed into the output image pixel space to generate the transformed grayscale image ROI boundary 144. As discussed above, distortions can be present between the grayscale image 130 and the output image pixel space (and the color image), and in some embodiments, the transformed grayscale image ROI boundary 144 is generated by performing a mapping between the two pixel spaces and applying a predetermined calibration that accounts for image distortions of the output image/color image with respect to the grayscale image. This predetermined calibration may also account for distortions including, but not limited to pincushion distortions, barrel distortions, waveform distortions or any other distortions or irregularities in the mapping between the images.

In one or more embodiments, the first processor 106 generates the output image ROI boundary box 146 such that the output image ROI includes only pixels, within the output image pixel space, that are also within both the scaled color image ROI boundary box 142 and the transformed grayscale image ROI boundary 144. In other words, only the pixels of the output image pixel space that correspond to both the color image ROI and the grayscale image ROI are included in the output image ROI. This output image ROI is the region of interest for which a higher resolution color image will be generated as described below. Based on the above, depending on the position of the position of the color image ROI and the grayscale image ROI, the output image ROI may be disposed anywhere within the output image (i.e., the output pixel space).

In one or more embodiments, for each of the pixels of the output image pixel space that are in an area outside of the output image ROI, the first processor 106 upscales the corresponding pixels of the color image. In other words, the first processor 106 linearly increases the pixel density by making multiple neighboring copies of the pixels of the color image 120. In one or more embodiments, this upscaling may further include: for each color image pixel spatially corresponding to an output image set of pixels, setting color values of each output image pixel, within the output image set of pixels, to be identical to color values of the color image pixel. For example, in a case where the color image 120 has a 2k resolution, and the output image pixel space has a 4k resolution, the first processor 106 may populate this area outside of the output image ROI with four copies of each pixel within the color image 120. Therefore, for the area outside of the output image ROI, the pixel density is increased to 4k, but the actual resolution of the features within this area of the output image will remain at a 2k resolution. However, in other embodiments, the area outside of the output image ROI may be excluded in cases where it is considered unnecessary to be included in the output image. In this case, the final output image may only include pixels with information within the output image ROI, while the pixels outside of the output image ROI may be either trimmed or set to a single color (such as black, gray, or any other color).

In one or more embodiments, the first processor 106 applies a spatial filter to pixels of the output image pixel space that are within the output image ROI, such that color values of the pixels of the output image 140 are based on both color values of the color image 120 and local contrast of the grayscale image 130. In this way, a full output image 140 may be generated that has a high-resolution color image of the subject within the region of interest.

In one or more embodiments, the applying of the spatial filter may further include, for each color image pixel spatially corresponding to an output image set of pixels, setting color values of one of the pixels, within the output image set of pixels, to be identical to color values of the color image pixel, and interpolating color values of other pixels, within the output image set of pixels, based on color values of neighboring pixels and based on grayscale values of corresponding pixels and corresponding neighboring pixels of the grayscale image. In other words, in the case described above, where color image 120 has 2k resolution and the output image 140 has 4k resolution, one pixel of the color image 120 corresponds to a group of four pixels in the output image 140. In one or more embodiments, one of the group of four output image pixels may be a copy of the corresponding color image pixel, while the remaining three color image pixels have color values that are interpolated using the corresponding pixels and neighboring pixels of the color image 120 and the grayscale image 130. This interpolation represents a spatial filter that is applied to the output image ROI to produce a higher resolution color image within this ROI.

Figure 4:
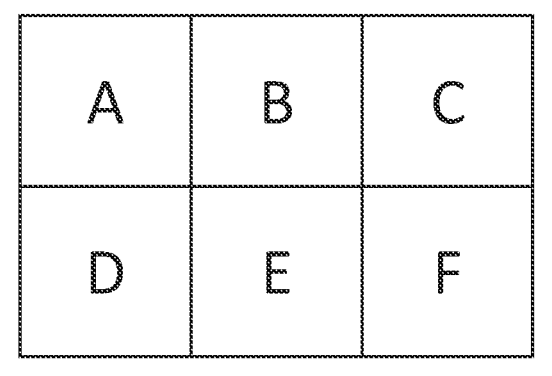

Turning now to FIG. 4, an example of an implementation of a spatial filter for achieving the higher resolution color image is a bilateral filter and will be described below. FIG. 4 illustrates a group of six pixels of the grayscale image 130, and each of the six pixels is labeled A-F for facilitating the description of the bilateral filter that may be employed, according to one or more embodiments. In this illustrative example, pixels A, B, D, and E represent the group of four output image pixels described above. Pixel A represents the one pixel of the group of four output image pixels that is set to be a copy of the corresponding color image pixel, and therefore pixels B, D, and E must be interpolated according to the applied spatial filter. Pixels C and F represent neighboring pixels that may be taken into account during the interpolation. Each of pixels A-F also have corresponding pixels in the grayscale image 130.

In this example, as described above, the first processor 106 populates pixels A and C by copying the corresponding pixels from the color image 120. Pixel B is then populated by interpolating across the horizontal direction as follows: $I_A$ and $I_C$ represent the known tone data for pixels A and C of the output image 140. $I_B$ represents the unknown tone data for pixel B to be determined. Additionally, $n_A$, $n_B$, and $n_C$ represent tone data for the pixels of the grayscale image 130 that correspond to pixels A, B, and C of the output image 140. The determination of $I_B$ incorporates weights according to spatial position ($ws_A$ and $ws_C$) and weights by local contrast of the grayscale image 130 ($wt_A$ and $wt_C$). In this case $ws_A$=0.5 and $ws_C$=0.5 because the spatial weighting for pixel B is equal between neighboring pixels A and C. The local contrast weights are determined as follows: $wt_A$=f($n_A$-$n_B$) and $wt_C$=f($n_C$-$n_B$), where:

$$f(t) = e^{-0.5 \cdot \left(\frac{t}{s}\right)^2}$$

and s is an adjustable parameter that determines contrast sensitivity. Based on the above, the tone of pixel B ($I_B$) is determined by the following:

$$I_B = \frac{ws_A * wt_A * I_A + ws_C * wt_C * I_C}{ws_A * wt_A + ws_C * wt_C}$$

In this way, the tone of pixel B ($I_B$) is determined as an interpolation of the tones of pixels A and C, where the interpolation weights are determined by both pixel position and also by the local contrast from the grayscale image 130.

In one or more embodiments, the above process for determining the color values of pixel B is repeated in the vertical direction in a similar way to determine the values for pixels D, E, and F. Additionally, in some embodiments, the color image 120 may employ an RGB color space. In this case, the above process may be repeated three times for each of the red, green, and blue color channels. In other embodiments, the color image 120 may employ the YUV color space. In this case, the above interpolation process is applied only to the Y channel and spatial-only interpolation is applied to the U and V channels. In general, it is within the scope of this disclosure for the above spatial filter or any other filter used in place of the above spatial filter to be adapted to the case where the color image 120 employs any arbitrary color space. Additionally, in other embodiments, a guided filter or any other suitable spatial filter or method of interpolation may be used as an alternative to the bilateral filter described above.

In one or more embodiments, the first processor 106 applies a blur to pixels of the output image at the output image ROI bounding box 146. Any suitable width or amount of blurring of the pixels in the vicinity of the output image ROI boundary box 146 may be applied in order to achieve an aesthetic output image 140 or to make less visible the transition from the high resolution inside the output image ROI to the lower resolution area outside of the output image ROI.

In one or more embodiments, the system 100 may be configured to perform the above-described process repeatedly on multiple images or frames of a video. The image sensors 102, 104 may each repetitively acquire video frames that are each processed by the second and/or third processors 108, 110 to produce the video frames, and the first processor 106 may repeat the above-described process in order to generate multiple images or video frames that have a high-resolution ROI including a subject 118. In some embodiments, the video frames may be acquired and/or processed in real time to produce a live video stream including high-resolution imagery of the subject 118. In other embodiments, the video frames may be saved to disk and later processed by the first processor 106.

Figure 5:
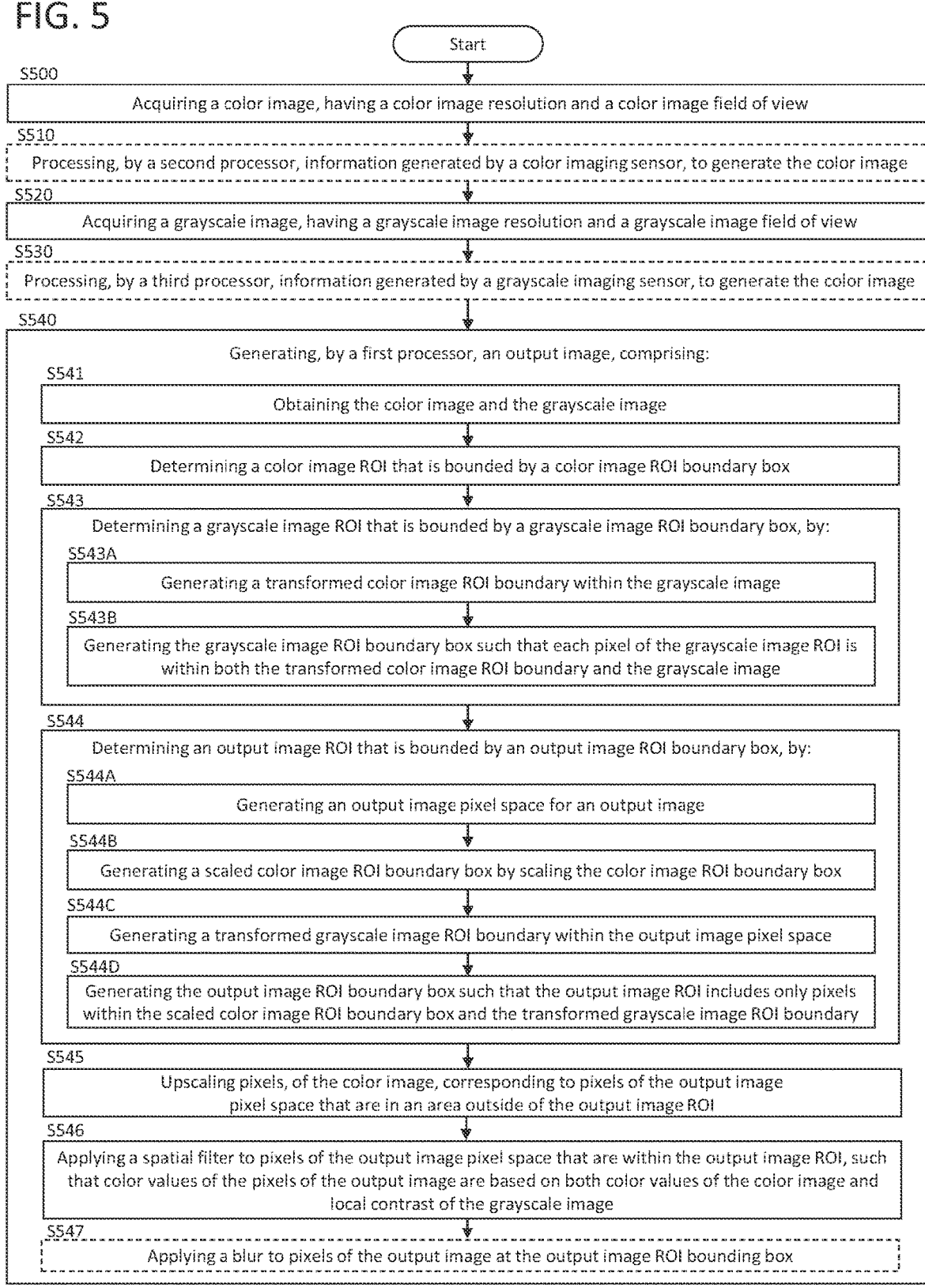
FIG. 5 shows a flowchart of a method for high resolution imaging of a subject, according to one or more embodiments of the invention.

FIG. 5 shows a flowchart of a method for high resolution imaging of a subject, according to one or more embodiments. One or more individual processes shown in FIG. 5 may be omitted, repeated, and/or performed in a different order than the order shown in FIG. 5. Accordingly, the scope of the invention should not be limited by the specific arrangement as depicted in FIG. 5. Additionally, according to one or more embodiments, the method depicted in FIG. 5 (and described below) may be implemented using the above-described imaging system 100 as well as any variation of the imaging system 100 or any other suitable system or apparatus.

At 8500, a color image is acquired by a color imaging sensor. The color image has a color image resolution and a color image field of view.

At 8510, information generated by a color imaging sensor is optionally processed by a second processor to generate the color image described in 8500.

At 8520, a grayscale image is acquired by a grayscale imaging sensor. The grayscale image has a grayscale image resolution and a grayscale image field of view. Additionally, the grayscale image is at least partially within the color image field of view, and the grayscale image resolution is greater than the color image resolution with respect to the color image field of view.

At 8530, information generated by a grayscale imaging sensor is optionally processed by a third processor to generate the grayscale image described in 8520.

At 8540, an output image is generated by a first processor. The process of generating the output image additionally includes steps S541-S547, described below.

At 8541, the first processor obtains the color image and grayscale image.

At 8542, the first processor determines a color image ROI, bounded by a color image ROI boundary box within the color image, such that the color image ROI includes the subject.

At 8543, the first processor determines a grayscale image ROI, bounded by a grayscale image ROI boundary box within the grayscale image. The process of determining the grayscale image ROI additionally includes steps S543A and S543B, described below.

At S543A, the first processor generates a transformed color image ROI boundary within the grayscale image by mapping positions, in the color image field of view, along the color image ROI boundary box to corresponding positions within the grayscale image field of view.

At S543B, the first processor generates the grayscale image ROI boundary box corresponding to a box that includes each pixel that is within both the transformed color image ROI boundary and the grayscale image.

At 8544, the first processor determines an output image ROI, bounded by an output image ROI boundary box. The process of determining the output image ROI additionally includes steps S544A-S544D, described below.

At S544A, the first processor generates an output image pixel space for an output image. The output image pixel space has an output image field of view that is identical to the color image field of view and an output image resolution that is identical to the grayscale image resolution (with respect to the color image field of view).

At S544B, the first processor generates a scaled color image ROI boundary box by scaling the color image ROI boundary box to the output image resolution.

At S544C, the first processor generates a transformed grayscale image ROI boundary within the output image pixel space by mapping positions, in the grayscale image field of view and along the grayscale image ROI boundary box, to corresponding positions within the output image field of view.

At S544D, the first processor generates the output image ROI boundary box such that the output image ROI includes only pixels, within the output image pixel space, that are within both the scaled color image ROI boundary box and the transformed grayscale image ROI boundary.

At 8545, the first processor upscales pixels, of the color image, corresponding to pixels of the output image pixel space that are in an area outside of the output image ROI.

At 8546, the first processor applies a spatial filter to pixels of the output image pixel space that are within the output image ROI, such that color values of the pixels of the output image are based on both color values of the color image and local contrast of the grayscale image.

At 8547, the first processor applies a blur to pixels of the output image at the output image ROI bounding box.

In this way, as also discussed above, a high-resolution image of a subject may be generated by the above-described method, which may be more efficient and reduce processor load as compared to other methods of generating a high-resolution image of a subject.

Additionally, in one or more embodiments, some or all of steps S500-S547 may be iteratively repeated multiple times or continuously in order to produce high-resolution video of a subject, as also described above.

Figure 6:
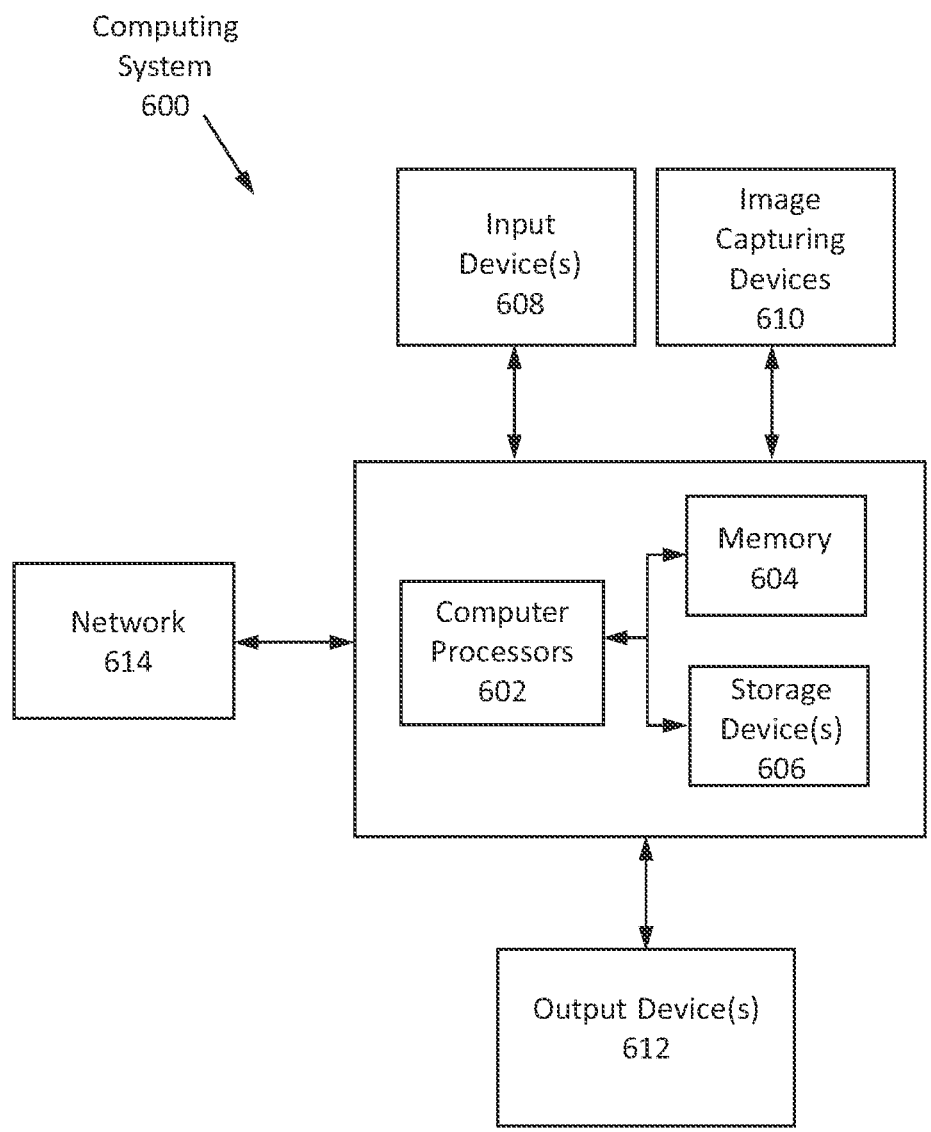
FIG. 6 show a block diagram of a computing system according to one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (608), such as a touchscreen, keyboard, mouse, microphone, touchpad, electronic pen, or any other type of input device. Further, the computing system (600) may include one or more output device(s) (612), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (614) (e.g., a local area network (LAN), a wide area network (WAN) such as the Internet, mobile network, or any other type of network) via a network interface connection (not shown). The input and output device(s) may be locally or remotely (e.g., via the network (614)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (614). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

In one or more embodiments, the memory (604) and/or the storage device (606) stores a static source image of a source face.

In one or more embodiments, the computing system (600) may include an image capturing device (610). The image capturing device captures a driving video comprising a plurality of driving video frames, wherein at least one of the driving video frames includes a driving face of a human. In one or more embodiments, the image capturing device may be a camera that can capture still images or video data.

One or more embodiments of the invention may have one or more of the following advantages and improvements over conventional technologies for high-resolution imaging of a subject: generating a high-resolution color image of the subject within the region of interest may be achieved at reduced cost and reduced processing load than would be required in the case of images acquired with a full-chip high-resolution color sensor; generating high-resolution video of a subject; the ability to have a dynamically moveable region of high-resolution within an image, sequence of images, video, or live video stream. One or more of the above advantages may improve a user's experience in applications involving images, video, or live video stream in that a subject of interest may be imaged with higher resolution than in conventional imaging systems.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An imaging system for high resolution imaging of a subject, the imaging system comprising:
    a color imaging sensor that acquires a color image having a color image resolution and a color image field of view;
    a grayscale imaging sensor that acquires a grayscale image having a grayscale image resolution and a grayscale image field of view, wherein
        the grayscale image field of view is at least partially within the color image field of view, and
        the grayscale image resolution is greater than the color image resolution with respect to the color image field of view; and
    a first processor that generates an output image by:
        obtaining the color image and the grayscale image;
        determining a color image region of interest (ROI), bounded by a color image ROI boundary box within the color image, such that the color image ROI includes the subject;
        determining a grayscale image ROI, bounded by a grayscale image ROI boundary box within the grayscale image, by:
            generating a transformed color image ROI boundary within the grayscale image by mapping positions, in the color image field of view, along the color image ROI boundary box to corresponding positions within the grayscale image field of view, and
            generating the grayscale image ROI boundary box corresponding to a box that includes each pixel that is within both the transformed color image ROI boundary and the grayscale image;
        determining an output image ROI, bounded by an output image ROI boundary box, by:
            generating an output image pixel space for an output image, wherein
                the output image pixel space has an output image field of view that is identical to the color image field of view, and
                the output image pixel space has an output image resolution that is identical to the grayscale image resolution;

generating a scaled color image ROI boundary box by scaling the color image ROI boundary box to the output image resolution;

generating a transformed grayscale image ROI boundary within the output image pixel space by mapping positions, in the grayscale image field of view and along the grayscale image ROI boundary box, to corresponding positions within the output image field of view; and generating the output image ROI boundary box such that the output image ROI includes only pixels, within the output image pixel space, that are within both the scaled color image ROI boundary box and the transformed grayscale image ROI boundary, and applying a spatial filter to pixels of the output image pixel space that are within the output image ROI, such that color values of the pixels of the output image are based on both color values of the color image and local contrast of the grayscale image.

2. The imaging system according to claim 1, wherein for each color image pixel spatially corresponding to an output image set of pixels:

for all pixels of the output image pixel space that are in an area outside of the output image ROI, the color image pixel is upscaled by setting color values of each output image pixel, within the output image set of pixels, to be identical to color values of the color image pixel; and the applying of the spatial filter further comprises:
setting color values of one of the pixels, within the output image set of pixels, to be identical to color values of the color image pixel, and
interpolating color values of other pixels, within the output image set of pixels, based on color values of neighboring pixels and based on grayscale values of corresponding pixels and corresponding neighboring pixels of the grayscale image.

3. The imaging system according to claim 1, wherein the generating of the transformed color image ROI boundary comprises:

applying a predetermined calibration that accounts for image distortions of the color image with respect to the grayscale image, and the generating of the transformed grayscale image ROI boundary comprises:

applying a predetermined calibration that accounts for image distortions of the grayscale image with respect to the color image.

4. The imaging system according to claim 1, further comprising:

applying a blur to pixels of the output image at the output image ROI bounding box.

5. The imaging system according to claim 1, wherein the first processor is configured to switch between displaying the color image and the output image.

6. The imaging system according to claim 1, further comprising:

a second processor that processes information generated by the color imaging sensor to generate the color image.

7. The imaging system according to claim 1, further comprising:

a third processor that processes information generated by the grayscale imaging sensor to generate the grayscale image.

8. A method for high resolution imaging of a subject, the method comprising:

acquiring, by a color imaging sensor, a color image having a color image resolution and a color image field of view;

acquiring, by a grayscale imaging sensor, a grayscale image having a grayscale image resolution and a grayscale image field of view, wherein
the grayscale image field of view is at least partially within the color image field of view, and
the grayscale image resolution is greater than the color image resolution with respect to the color image field of view; and generating, by a first processor, an output image, comprising:
obtaining the color image and the grayscale image;
determining a color image region of interest (ROI), bounded by a color image ROI boundary box within the color image, such that the color image ROI includes the subject;

determining a grayscale image ROI, bounded by a grayscale image ROI boundary box within the grayscale image, by:
generating a transformed color image ROI boundary within the grayscale image by mapping positions, in the color image field of view, along the color image ROI boundary box to corresponding positions within the grayscale image field of view, and
generating the grayscale image ROI boundary box corresponding to a box that includes each pixel that is within both the transformed color image ROI boundary and the grayscale image;

determining an output image ROI, bounded by an output image ROI boundary box, by:
generating an output image pixel space for an output image, wherein
the output image pixel space has an output image field of view that is identical to the color image field of view, and
the output image pixel space has an output image resolution that is identical to the grayscale image resolution;

generating a scaled color image ROI boundary box by scaling the color image ROI boundary box to the output image resolution;

generating a transformed grayscale image ROI boundary within the output image pixel space by mapping positions, in the grayscale image field of view and along the grayscale image ROI boundary box, to corresponding positions within the output image field of view; and generating the output image ROI boundary box such that the output image ROI includes only pixels, within the output image pixel space, that are within both the scaled color image ROI boundary box and the transformed grayscale image ROI boundary, and applying a spatial filter to pixels of the output image pixel space that are within the output image ROI, such that color values of the pixels of the output image are based on both color values of the color image and local contrast of the grayscale image.

9. The method according to claim 8, wherein for each color image pixel spatially corresponding to an output image set of pixels:

for all pixels of the output image pixel space that are in an area outside of the output image ROI, the color image pixel is upscaled by setting color values of each output image pixel, within the output image set of pixels, to be identical to color values of the color image pixel; and the applying of the spatial filter further comprises:

setting color values of one of the pixels, within the output image set of pixels, to be identical to color values of the color image pixel, and interpolating color values of other pixels, within the output image set of pixels, based on color values of neighboring pixels and based on grayscale values of corresponding pixels and corresponding neighboring pixels of the grayscale image.

10. The method according to claim 8, wherein the generating of the transformed color image ROI boundary further comprises:

applying a predetermined calibration that accounts for image distortions of the color image with respect to the grayscale image, and the generating of the transformed grayscale image ROI boundary further comprises:

applying a predetermined calibration that accounts for image distortions of the grayscale image with respect to the color image.

11. The method according to claim 8, wherein the generating, by the first processor, of the output image further comprises:

applying a blur to pixels of the output image at the output image ROI bounding box.

12. The method according to claim 8, wherein the first processor is configured to switch between displaying the color image and the output image.

13. The method according to claim 8, further comprising: processing, by a second processor, information generated by the color imaging sensor to generate the color image.

14. The method according to claim 8, further comprising: processing, by a third processor, information generated by the grayscale imaging sensor to generate the grayscale image.

15. A non-transitory computer readable medium (CRM) storing computer readable program code for high resolution imaging of a subject, the computer readable program code causes a computer to:

generate, by a first processor, an output image, wherein the generating comprises:

obtaining a color image and a grayscale image, wherein the color image has a color image resolution and a color image field of view, the grayscale image has a grayscale image resolution and a grayscale image field of view, the grayscale image field of view is at least partially within the color image field of view, and the grayscale image resolution is greater than the color image resolution with respect to the color image field of view;

determine a color image region of interest (ROI), bounded by a color image ROI boundary box within the color image, such that the color image ROI includes the subject;

determine a grayscale image ROI, bounded by a grayscale image ROI boundary box within the grayscale image, by:

generating a transformed color image ROI boundary within the grayscale image by mapping positions, in the color image field of view, along the color image ROI boundary box to corresponding positions within the grayscale image field of view, and generating the grayscale image ROI boundary box corresponding to a box that includes each pixel that is within both the transformed color image ROI boundary and the grayscale image;

determine an output image ROI, bounded by an output image ROI boundary box, by:

generating an output image pixel space for an output image, wherein the output image pixel space has an output image field of view that is identical to the color image field of view, and the output image pixel space has an output image resolution that is identical to the grayscale image resolution;

generating a scaled color image ROI boundary box by scaling the color image ROI boundary box to the output image resolution;

generating a transformed grayscale image ROI boundary within the output image pixel space by mapping positions, in the grayscale image field of view and along the grayscale image ROI boundary box, to corresponding positions within the output image field of view; and generating the output image ROI boundary box such that the output image ROI includes only pixels, within the output image pixel space, that are within both the scaled color image ROI boundary box and the transformed grayscale image ROI boundary, and applying a spatial filter to pixels of the output image pixel space that are within the output image ROI, such that color values of the pixels of the output image are based on both color values of the color image and local contrast of the grayscale image.

16. The non-transitory CRM according to claim 15, wherein for each color image pixel spatially corresponding to an output image set of pixels:

for all pixels of the output image pixel space that are in an area outside of the output image ROI, the color image pixel is upscaled by setting color values of each output image pixel, within the output image set of pixels, to be identical to color values of the color image pixel; and the applying of the spatial filter further comprises:

setting color values of one of the pixels, within the output image set of pixels, to be identical to color values of the color image pixel, and interpolating color values of other pixels, within the output image set of pixels, based on color values of neighboring pixels and based on grayscale values of corresponding pixels and corresponding neighboring pixels of the grayscale image.

17. The non-transitory CRM according to claim 15, wherein the generating of the transformed color image ROI boundary further comprises:

applying a predetermined calibration that accounts for image distortions of the color image with respect to the grayscale image, and the generating of the transformed grayscale image ROI boundary further comprises:

applying a predetermined calibration that accounts for image distortions of the grayscale image with respect to the color image.

18. The non-transitory CRM according to claim 15 wherein the generating, by the first processor, of the output image further comprises:

applying a blur to pixels of the output image at the output image ROI bounding box.

19. The non-transitory CRM according to claim 15, wherein the computer readable program code further includes instructions for switching, by the first processor, between displaying the color image and the output image.

20. The non-transitory CRM according to claim 15, wherein the computer readable program code further causes the computer to:
process, by a second processor, information generated by a color imaging sensor to generate the color image.

* * * * *